United States Patent [19]
Yamamoto

[11] Patent Number: 5,928,853
[45] Date of Patent: Jul. 27, 1999

[54] METHOD OF MANUFACTURING SILVER HALIDE EMULSION

[75] Inventor: Shinichi Yamamoto, Tokyo, Japan

[73] Assignee: Konica Corporation, Japan

[21] Appl. No.: 08/924,084

[22] Filed: Aug. 28, 1997

[30] Foreign Application Priority Data

Aug. 29, 1996  [JP]  Japan .................................. 8-228468

[51] Int. Cl.⁶ ............................. G03C 1/015; G03C 1/035
[52] U.S. Cl. ........................................... 430/569; 430/567
[58] Field of Search .................................. 430/567, 569

[56] References Cited

U.S. PATENT DOCUMENTS

| | | | |
|---|---|---|---|
| 4,336,328 | 6/1982 | Brown et al. ........................... | 430/569 |
| 4,758,505 | 7/1988 | Hoffmann ............................... | 430/569 |
| 5,169,750 | 12/1992 | Vacca ..................................... | 430/569 |
| 5,242,597 | 9/1993 | McArdle ................................. | 210/652 |
| 5,270,159 | 12/1993 | Ichikawa et al. ...................... | 430/569 |

FOREIGN PATENT DOCUMENTS 2436461  2/1975  Germany .

OTHER PUBLICATIONS

European Search Report EP 97 30 6611.
EPO—Patent Abstracts of Japan, Publication #01158426, Publication date: Jun. 21, 1989.

*Primary Examiner*—Mark F. Huff
*Attorney, Agent, or Firm*—Jordan B. Bierman; Bierman, Muserlian and Lucas

[57] ABSTRACT

Disclosed is a method of manufacturing a silver halide emulsion, the method comprising the step of ultrafiltrating and electrodialyzing a silver halide emulsion containing silver halide grains and gelatin having an average molecular weight of 500 to 70,000, by means of an ultrafiltration unit having an ultrafiltration membrane, whereby the emulsion is desalted and concentrated.

14 Claims, 3 Drawing Sheets

5,928,853

METHOD OF MANUFACTURING SILVER HALIDE EMULSION

FIELD OF THE INVENTION

The invention relates to a method of manufacturing a silver halide emulsion used in a silver halide photographic light-sensitive material and particularly to a method of manufacturing a silver halide emulsion which gives high sensitivity, superior graininess, and excellent storage stability.

BACKGROUND OF THE INVENTION

Gelatin has long been used as a dispersion medium of silver halide grains in a silver halide emulsion. In the conventional silver salt photographic system, gelatin plays an important role over the entire process from silver halide grain growth to protection of the final photographic images.

When gelatin is classified by its molecular weight, it is classified into a high molecular weight gelatin with a molecular weight of 300,000 or more, a γ component with a molecular weight of around 300,000, a β component with a molecular weight of around 200,000, a α component with a molecular weight of around 100,000, and a low molecular weight gelatin with a molecular weight of 100,000 or less. The molecular weight distribution varies depending upon the raw material or the manufacturing conditions of solubilizing treatment, and upon the extraction condition.

As gelatin for photographic use, a mixture of these gelatins with various molecular weights is used, and generally, gelatin with an average molecular weight of 70,000 to 130,00 is preferably used, which is obtained by lime-treating hide gelatin or ossein gelatin.

It is well-known that gelatin as a dispersion medium has an influence on silver halide grain crystal formation or growth in the formation process of the silver halide grains. Herein, the molecular weight or structure of gelatin or impurities contained in the gelatin are considered to influence in this process.

In Japanese Patent O.P.I. Publication Nos. 1-158426, 1-213637 and 2-838 is disclosed a technique which increases a content of tabular silver halide grains or hexagonal tabular silver halide grains by employing low molecular weight gelatin as a dispersion medium in the manufacture of silver halide emulsions. The monodisperse emulsion having such a silver halide shape and a uniform grain size distribution is considered to be effective in obtaining a silver halide photographic light sensitive material providing both high sensitivity and high image quality. However, when the low molecular weight gelatin is used in the silver halide emulsion manufacturing process, there is the problem in that storage stability of the silver halide emulsion is deteriorated.

SUMMARY OF THE INVENTION

Accordingly, an object of the invention is to provide a method of manufacturing a silver halide emulsion giving a silver halide photographic light sensitive material with high sensitivity, superior graininess and excellent storage stability.

DETAILED DESCRIPTION OF THE INVENTION

Figure 1:
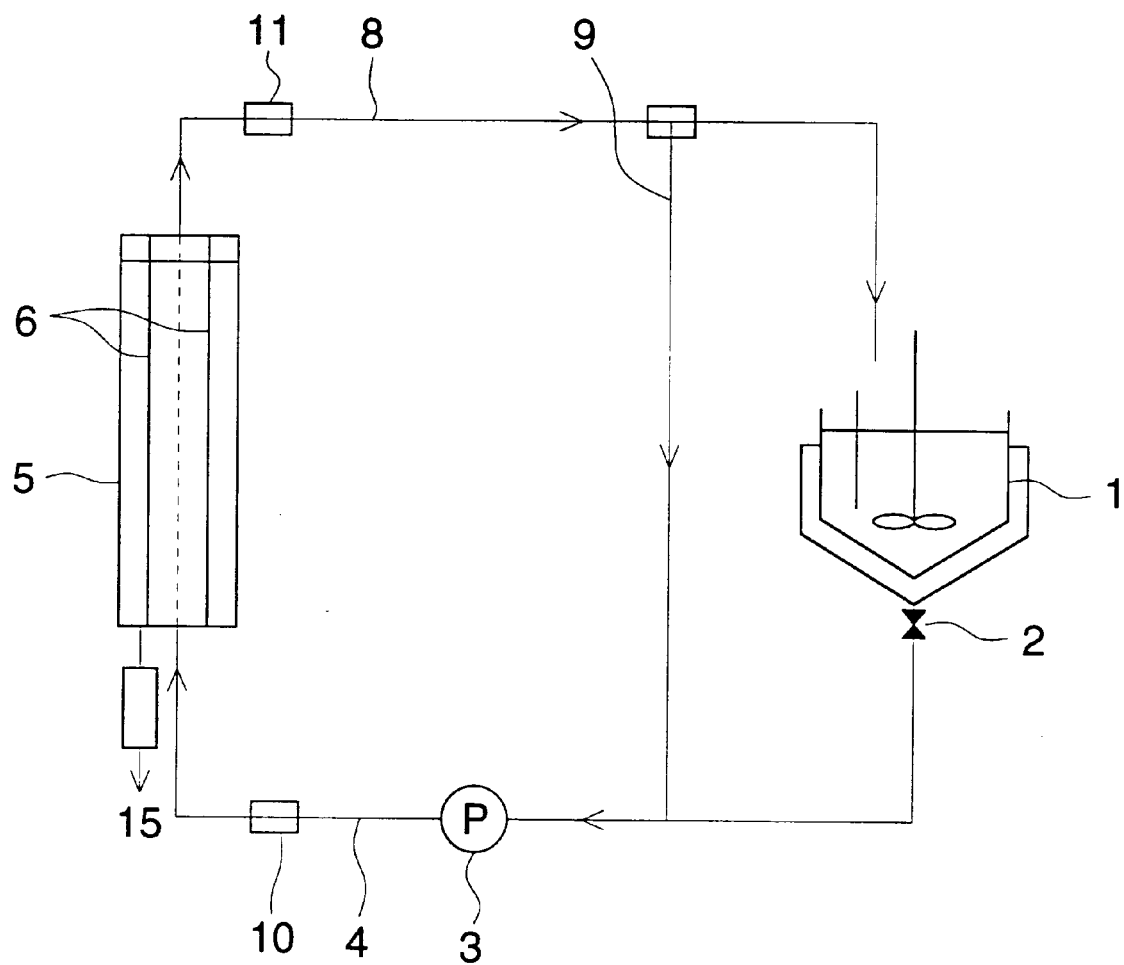
FIG. 1 shows one embodiment of an ultrafiltration apparatus.

The above object of the invention can be attained by the following:

1. a method of manufacturing a silver halide emulsion, the method comprising the step of:
   ultrafiltrating a silver halide emulsion containing gelatin having an average molecular weight of 500 to 70,000 as a dispersion medium, whereby the emulsion is desalted and concentrated, 2. a method of manufacturing a silver halide emulsion, the method comprising the step of:
   ultrafiltrating and dialyzing a silver halide emulsion containing gelatin having an average molecular weight of 500 to 70,000 as a dispersion medium, whereby the emulsion is desalted and concentrated, 3. a method of manufacturing a silver halide emulsion, the method comprising the step of ultrafiltrating a silver halide emulsion containing silver halide grains and gelatin having an average molecular weight of 500 to 70,000, by means of an ultrafiltration unit having an ultrafiltration membrane, whereby the emulsion is desalted and concentrated, 4. The method of item 3, further comprising the step of electrodialyzing the silver halide emulsion containing silver halide grains and gelatin having an average molecular weight of 500 to 70,000, 5. the method of item 3, wherein the average molecular weight of the gelatin is 2,000 to 40,000, 6. the method of claim 1, wherein the ultrafiltration membrane cuts off a molecule with a molecular weight of 10,000 or less, 7. the method of item 3, wherein the pressure applied to the emulsion contacting the ultrafiltration membrane of the ultrafiltration unit is 1 to 10 kg/cm$^2$, 8. the method of item 4, wherein electric conductivity of the electrodialyzed emulsion is 1 to 10 mS/cm, 9. the method of item 4, wherein the electrodialyzing is carried out applying DC10V to DC30V.

10. the method of item 3, wherein the silver halide grains are tabular silver halide grains having a coefficient of variation of the circle equivalent diameter of the tabular silver halide grain projected area of 0 to 30%, 11. the method of item 10, wherein the number of tabular silver halide grains having dislocation lines of 5 or more per grain is not less than 50% of the total number of the tabular silver halide grains, or 12. the method of item 3, wherein the concentrated emulsion is not more than one third by volume of the emulsion before the concentration.

The invention will be detailed below.

The silver halide emulsion is prepared by reacting a water soluble silver salt, e.g., silver nitrate, aqueous solution with a halide solution in the presence of a protective colloid dispersion medium, e.g., gelatin to produce silver halide precipitations.

In the invention, at least one gelatin with a specific molecular weight is used as the dispersion medium. In the invention, the average molecular weight of gelatin is 500 to 70,000, preferably 2,000 to 40,000, and more preferably 5,000 to 25,000. The average molecular weight of gelatin can be measured by a conventional method, for example, gel permeation chromatography.

The average molecular weight herein referred to implies a weight average molecular weight. In the invention, measurement according to the gel permeation chromatography method was carried out employing LC-6A produced by Shimazu Seisakusho Co., Ltd., a detector, L-4250 produced by Hitachi Seisakusho Co., Ltd., Asahipak GS-620 as a column produced by Showa Denko Co., Ltd., and STANDARD P-82 as a standard material produced by Showa Denko Co., Ltd. The measurement was measured under conditions according to a PAGI method.

The average molecular weight of gelatin can be controlled by a conventional method such as hydrolysis by acid or base, decomposition by enzyme, a coacervation method, or crosslinking bond cleavage by supersonic wave application. The decomposition by enzyme is preferable in that it cleaves specific bonds in the gelatin molecule to produce a low molecular weight gelatin with a relatively narrow molecular weight distribution and the average molecular weight of gelatin can be controlled by the decomposition time. The decomposition by enzyme is disclosed in R. J. Cox, "Photographic Gelatin II", Academic Press, London, 233–251 and 335–346 (1976), and the coacervation method is disclosed in Pouradir, "J. Chem. Phys.", 47, 391 and 49, 85.

Another conventional gelatin manufacturing method is disclosed in detail in "Shashinkogaku no Kiso, Ginen Shashin Hen", edited by Nihon Shashin Gakkai, Corona Co., 122–124, and Asar Guais, "The Macromolecular Chemistry of Gelatin", Academic Press (1964).

Gelatin in the invention may be lime-processed gelatin or acid-processed gelatin, but lime-processed gelatin is preferable. Gelatin may be a modified gelatin such as phthalated gelatin or acetylated gelatin. Further, gelatin in the invention may be deionized by an ion exchange resin or subjected to oxidation treatment by hydrogen peroxide or other oxidizing agents.

Gelatin in the invention can be used in admixture with another hydrophilic protective colloid. The hydrophilic protective colloid includes gelatin derivatives, a grafted polymer of gelatin with another polymer, a protein such as albumin or casein, a cellulose derivative such as hydroxyethylcellulose, carboxymethylcellulose or cellulose sulfate, sodium alginate, a saccharide derivative such as a starch derivative, and synthetic hydrophilic polymers (homopolymers or copolymers) such as polyvinyl alcohol, partially acetal polyvinyl alcohol, poly-N-vinylpyrrolidone, polyacrylic acid, polymethacrylic acid, polyacrylamide, polyvinyl imidazole and polyvinyl pyrazole.

The silver halide grains in the silver halide emulsion prepared according to the invention are preferably tabular silver halide grains.

Tabular silver halide grains (hereinafter, denoted simply as tabular grains) used in the invention are those having two parallel major faces and an aspect ratio of circle equivalent diameter of the major face (i.e., a diameter of a circle having an area equivalent to the major face) to grain thickness (i.e., a distance between the major faces) of two or more.

The silver halide grains in the silver halide emulsion prepared according to the invention are preferably tabular silver halide grains having an average aspect ratio of preferably 5 to 20, and more preferably 8 to 20.

The average aspect ratio herein referred to is obtained by measuring both projected area diameter and thickness of each of at least 1000 randomly sampled grains to obtain an aspect ratio, and then computing the arithmetic mean thereof. In the invention, hexahedral, octahedral or tetrahedral normal crystal silver halide grains, or silver halide grains having two or more non-parallel twin planes, when they have an average aspect ratio of 5 or more, can be regarded as tabular silver halide grains.

The diameter and thickness of the tabular grains can be determined according to the method described in U.S. Pat. No. 4,434,226.

The average diameter of the tabular grains is within a range of preferably 0.3 to 10 $\mu$m, more preferably, 0.5 to 5.0 $\mu$m, and still more preferably, 0.5 to 2.0 $\mu$m. The average grain thickness is preferably 0.05 to 0.8 $\mu$m.

The silver halide grains in the invention are preferably silver iodobromide or silver chloroiodobromide. These grains have a silver iodide content of preferably 1 to 15 mol %, and more preferably, 3 to 10 mol %.

With regard to the fluctuation of the silver iodide content among grains, a variation coefficient of the silver iodide content (i.e., a standard deviation of the silver iodide content divided by an average silver iodide content) is preferably 0 to 30%, and more preferably, 0 to 20%.

It is preferred in the silver halide grains in the invention that 30% or more of the total silver halide grains comprise at least two silver halide phases which are different in the silver iodide content from each other. Among these phases, a phase having a maximum silver iodide content contains silver iodide of preferably 5 to less than 8 mol %. The maximum silver iodide containing phase accounts for, preferably 30 to 90%, and more preferably 30 to 60% of the grain volume.

An outer phase which is adjacent to the phase having the maximum silver iodide content contains preferably silver iodide of 0 to 8 mol % of silver iodide, more preferably, 2 to 5 mol %.

The maximum silver iodide-containing phase is preferably adjacent to an outer phase with a lower silver iodide content, which need not cover completely the maximum silver iodide-containing phase.

The structure regarding the halide composition of silver halide grains can be determined by X-ray diffraction method and EPMA method The surface of tabular grains may have a silver iodide content higher than that of the maximum iodide containing phase. The surface silver iodide content is a value measured by a XPS method or ISS method. In the case when measured by a XPS method, the surface silver iodide content is preferably 0 to 12 mol %, more preferably, 5 to 10 mol %.

The surface silver iodide content can be determined by the XPS method in the following manner. A sample is cooled down to −115° C. or lower under a super high vaccum of $1\times10^{-8}$ torr or less, exposed to X-ray of Mg—K$\alpha$ line generated at a X-ray source voltage of 15 kV and X-ray source current of 40 mA and measured with respect to Ag3d5/2, Br3d and I3d3/2 electrons. From integrated intensities of peaks measured which has been corrected with a sensitivity factor, the halide composition of the surface can be determined.

The maximum iodide containing phase within the tabular grain does not include a high iodide-localized region formed by a treatment which is carried out for the purpose of forming dislocation lines, as described later.

With regard to the grain size disribution of the tabular grains, a coefficient of variation of the circle equivalent diameter of the tabular silver halide grain projected area is preferably 0 to 30%, more preferably 0 to 20%, and still more preferably 0 to 20%. Herein, the circle equivalent diameter is a diameter of a circle having the same area as the projected area.

In the invention, a coefficient of variation of the circle equivalent diameter is represented by the following equation:

(Standard deviation of circle equivalent diameter an average circle equivalent diameter)×100=Coefficient of variation of the circle equivalent diameter (%)

Tabular grains relating to the invention can be prepared by combining optimally methods known in the art. There can be referred, for example, known methods described in JP-A 61-6643 (1986), 61-146305 (1986), 62-157024 (1987), 62-18556 (1987), 63-92942 (1988), 63-151618 (1988), 63-163451 (1988), 63-220238 (1988) and 63-311244 (1988). There can be employed a simultaneous mixing method, double jet method, controlled double jet method in which the pAg of a reaction mixture solution is maintained at a given value during the course of forming silvr halide grains and a triple jet method in which soluble silver halided different in the halide composition are independently added. Normal precipitation or reverse precipitation in which silver halide grains are formed in the presence of silver ions in excess may be employed.

There may be optionally employed a silver haliude solvent. As silver halide solvent often used are cited ammonia, thioethers and thioureas. With regard to thioethers, there can be referred U.S. Pat. Nos. 3,271,157, 3,790,387 and 3,574,628. Further, neutral method without the use of ammonia, acid method and ammoniacal method may be employed. In view of the prevention of fogging silver halide grains, the pH is preferably 5.5 or less, more preferably, 4.5 or less.

Silver halide grains may contain iodide. In this case, there is no limitation with regard to the addition method of iodide ions. The iodide ions may be added in the form of an ionic solution such as an aqueous potassium iodide solution or in the form of silver iodide fine grains.

Silver halide grains prepared by the method of the invention can be grown using silver halide fine grains, as disclosed in JP-A 1-183417 (1989) and 1-183645 (1989). There may be employed two or more kinds of silver halide fine grains, at least one of which contains one kind of halide, as disclosed in Japanese Patent O.P.I. Pulication No.5-5966.

As disclosed in JP-A 2-167537 (1990), silver halide grains can be grown, at a time during the course of grain growth, in the presence of silver halide grains having a solubility product less than that of the growing grains. The silver halide grains having less solubility product are preferably silver iodide.

In the present invention, silver halide grains preferably have dislocation lines within the grain.

The dislocation lines in tabular grains can be directly observed by means of transmision electron microscopy at a low temperature, for example, in accordance with methods described in J. F. Hamilton, Phot..Sci.Eng. 11 (1967) 57 and T. Shiozawa, J.Sci.Phot.Sci.Japan, 35 (1972) 213.

Silver halide tabular grains are taken out from an emulsion while making sure not to exert any pressure that causes dislocation in the grains, and they are placed on a mesh for electron microscopy. The sample is observed by transmission electron microscopy, while being cooled to prevent the grain from being damaged (e.g., printing-out) by electron beam. Since electron beam penetration is hampered as the grain thickness increases, sharper observations are obtained when using an electron microscope of high voltage type (over 200 KV for 0.25 μm thich grains). From the thus-obtained electron micrograph the position and number of the dislocation lines in each grain can be determined in the case when being viewed from the direction perpendicular to the major face.

With respect to the position of the dislocation lines in the tabular grains relating to the present invention, it is preferable that the dislocation lines exist in a fringe portion of the major face and an inner portion thereof.

The term, "fringe portion" refers to a peripheral portion in the major face of the tabular grain. More specifically, when a straight line is drawn outwardly from the gravity center of the projection area projected from the major face-side, the dislocation lines exist in a region outer than 50%, preferably, 70%, and more preferably 80% of the distance (L) between the intersection of the straight line with the outer periphery and the center. (In other words, the dislocation lines are located in the region between 0.5 L and L outwardly from the gravity center of each grain, preferably between 0.7 L and L, more preferably between 0.8 L and L.)

The term, "dislocation lines which exist in the inner portion" refer to those which exist in the region other than the fringe portion above-described.

With regard to the number of dislocation lines in the tabular grains relating to the present invention, tabular grains having dislocation lines of 5 or more per grain account for, preferably, not less than 50% (by number) of the total number of silver halide grains, more preferably not less than 50%, and furthermore preferably 80%. The number of the dislocation lines is preferably 10 or more per grain.

In the case when the dislocation lines exist both in the fringe portion and in the inner portion, it is preferable that 5 or more dislocations are present in the inner portion of the grain. More preferably, 5 or more dislocation lines are both in the fringe portion and in the inner portions.

With regard to a method for introducing the dislocation lines into the silver halide grain, there is specifically no limitation. The dislocation lines can be introduced, for example, as follows. At a desired position of introducing the dislocation lines during the course of forming silver halide grains, an aqeous iodide (e.g., potassium iodide) solution is added, along with a silver salt (e.g., silver nitrate) solution and without addition a halide other than iodide, at a pAg of 11.0 or less by a double jet, silver iodide fine grains are added, only an iodide solution is added, or a compound capable of releasing an iodide ion disclosed in JP-A 6-11781 (1994) is employed. Among these, it is preferable to add iodide and silver salt solutions by double jet, or to add silver iodide fine grains or an iodide ion releasing compound, as an iodide sourse. It is more preferable to use silver iodide fine grains.

With regard to the position of the dislocation lines, it is preferable to introduce the dislocation lines after forming the maximum iodide containing silver halide phase.

Specifically, the dislocation lines are introduced at a time after preferably 50 to 95%, more preferably 60 to 80% of the total silver salt are added, during the course of forming silver halide grains used in the invention.

The silver halide emulsion prepared by the method of the invention preferably contains a compound represented by the following formula (I):

Het—(SR)i  Formula (I)

wherein Het represents a heterocyclic group; and R represents a hydrogen atom, an alkyl group, an alkenyl group, an alkinyl group, an aryl group or a heterocyclic group; and i represents an integer of 1 or 2, provided that Het or R directly or indirectly has at least one selected from the group consisting of —$SO_3H$, —COOH, —OH and a salt thereof.

The heterocyclic group represented by Het includes oxazolyl, imidazolyl, thiazolyl, triazolyl, selenazolyl, tetrazolyl, oxadiazolyl, thiadiazolyl, thiazinyl, triazinyl, benzoxazolyl, benzothiazolyl, benzimidazolyl, indoleninyl, benzselenazolyl, naphthothiazolyl, triazaindolizinyl, diazaindolizinyl, and tetrazaindolizinyl.

Of compounds represented by formula (I), a compound represented by formula (II) or (III) is preferable.

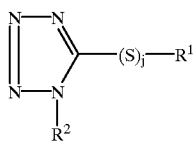

Formula (II)

wherein R¹ and R² independently represent a hydrogen atom, an alkyl group, an alkenyl group, an alkinyl group, an aryl group or a heterocyclic group; and j represents an integer of 0 or 1, provided that R¹ or R² directly or indirectly has at least one selected from the group considting of —SO3H, —COOH, —OH and a salt thereof.

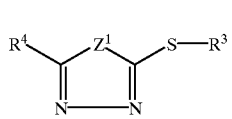

Formula (III)

wherein $R^3$ represents a hydrogen atom, an alkyl group, an alkenyl group, an alkinyl group, an aryl group or a heterocyclic group; and $R^4$ represents a substituent.

The substituent represented by $R^4$ represents a hydrogen atom, an alkyl group, an alkenyl group, an alkinyl group, an aryl group, a heterocyclic group, a halogen atom, an alkoxy group, an aryloxy group, an alkoxycarbonyl group, an aryloxycarbonyl group, a sulfonamide group, a sulfamoyl group, a ureido group, an acyl group, a carbamoyl group, an amino group, a sulfonyl group, an amino group, a cyano group, a nitro group, a carboxy group, a hydroxy group, a mercapto group, an alkylthio group, an arylthio group, an alkenylthio group, and a heterocyclicthio group.

$Z^1$ represents oxygen, sulfur or —N($R^5$)—, in which $R^5$ represents a hydrogen atom, an alkyl group, an alkenyl group, an alkinyl group, an aryl group, a heterocyclic group or —N($R^6$) ($R^7$)—, in which $R^6$ and $R^6$ independently represent a hydrogen atom, an alkyl group, an alkenyl group, an alkinyl group, an aryl group, a heterocyclic group, provided that $R^3$, $R^4$ or $R^5$ directly or indirectly has at least one selected from the group considting of —SO3H, —COOH, —OH and a salt thereof.

The cation forming the salt includes preferably an alkali metal cation (for example, $Na^+$, $K^+$), an alkali earth metal cation (for example, $Ca^{++}$, $Mg^{++}$), and an ammonium cation (for example, an ammonium cation, a triethylammonium cation, a pyridinium cation).

The alkyl group represented by R, $R^1$, $R^2$, $R^5$, $R^4$, $R^5$, $R^6$, or $R^7$ includes methyl, ethyl, propyl, i-propyl, butyl, t-butyl, pentyl, cyclopentyl, hexyl, cyclohexyl, octyl and dedecyl. The alkyl group may have a substituent such as a halogen atom (for example, chlorine, bromine, fluorine), an alkoxy group (for example, methoxy, ethoxy, 1,1-dimethylethoxy, hexyloxy, dodecyloxy), an aryloxy group (for example, phenoxy, naphthyloxy), an aryl group (for example, phenxyl, naphthyl), an alkoxycarbonyl group (for example, methoxycarbonyl, ethoxycarbonyl, butoxycarbonyl, 2-ethylhexylcarbonyl), an aryloxycarbonyl group (for example, phenoxycarbonyl, naphthyloxycarbonyl), a heterocyclic group (for example, 2-pyridyl, 3-pyridyl, 4-pyridyl, morphoryl, piperidyl, piperazinyl, selenazolyl, sulfolanyl, tetrazolyl, thiazolyl, oxazolyl, imidazolyl, thienyl, pyrrolyl, pyrazinyl, pyrimidinyl, pyridazinyl, pyrazolinyl, furyl), an amino group (for example, amino, N,N-dimethylamino, anilino), a hydroxy group, a cyano group, a sulfo group, a carboxy group or a sulfonamido group (for example, methylsulfonylamino, ethylsulfonylamino, butylsulfonylamino, octylsulfonylamino, phenylsulfonylamino).

The alkenyl group represented by R, $R^1$, $R^2$, $R^5$, $R^4$, $R^5$, $R^6$, or $R^7$ includes vinyl and allyl, and the alkinyl group includes propagyl. The aromatic group represented by represented by R, $R^1$, $R^2$, $R^5$, $R^4$, $R^5$, $R^6$, or $R^7$ includes phenyl and naphthyl. The heterocyclic group represented by represented by R, $R^1$, $R^2$, $R^5$, $R^4$, $R^5$, $R^6$, or $R^7$ includes pyridyl (for example, 2-pyridyl, 3-pyridyl, 4-pyridyl), thiazolyl, oxazolyl, imidazolyl, furyl, thienyl, pyrrolyl, pirazinyl, pyrimidinyl, pyridazinyl, selenazolyl, sulfolanyl, piperidinyl, pyrazolyl and tetrazolyl.

The above alkenyl, alkinyl, aromatic or heterocycloc group may have, as a substituent, the alkyl group represented by R, $R^1$, $R^2$, $R^5$, $R^4$, $R^5$, $R^6$, or $R^7$ or the substituent denoted above in the alkyl group.

Exemplified compounds represented by formula (I), (II) or (III) are listed below, but the invention is not limited thereto.

I-1

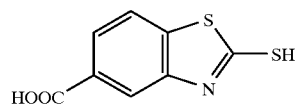

I-2

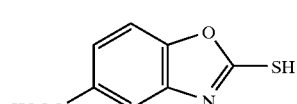

I-3

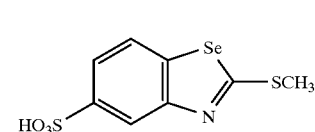

I-4

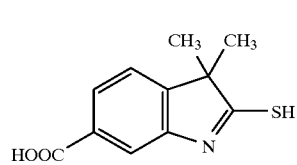

I-5

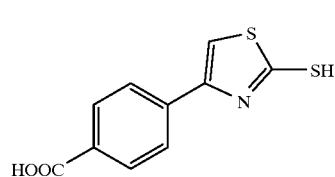

I-6

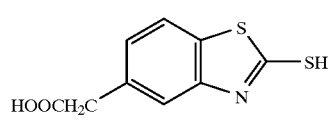

I-7

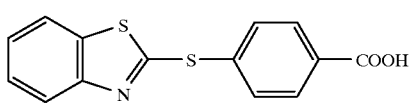

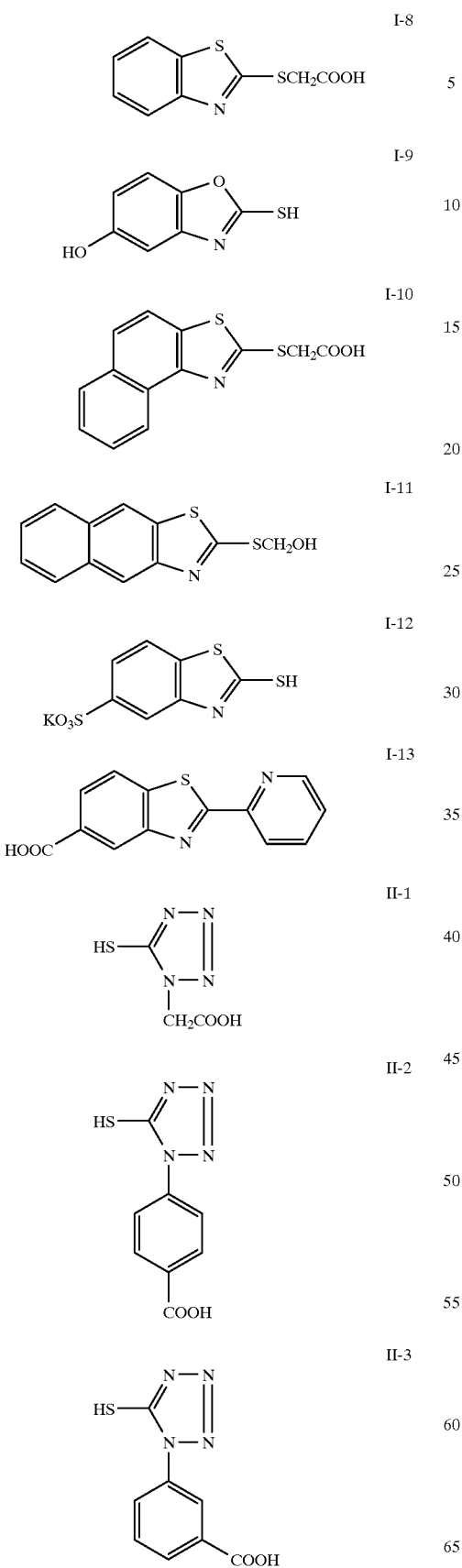
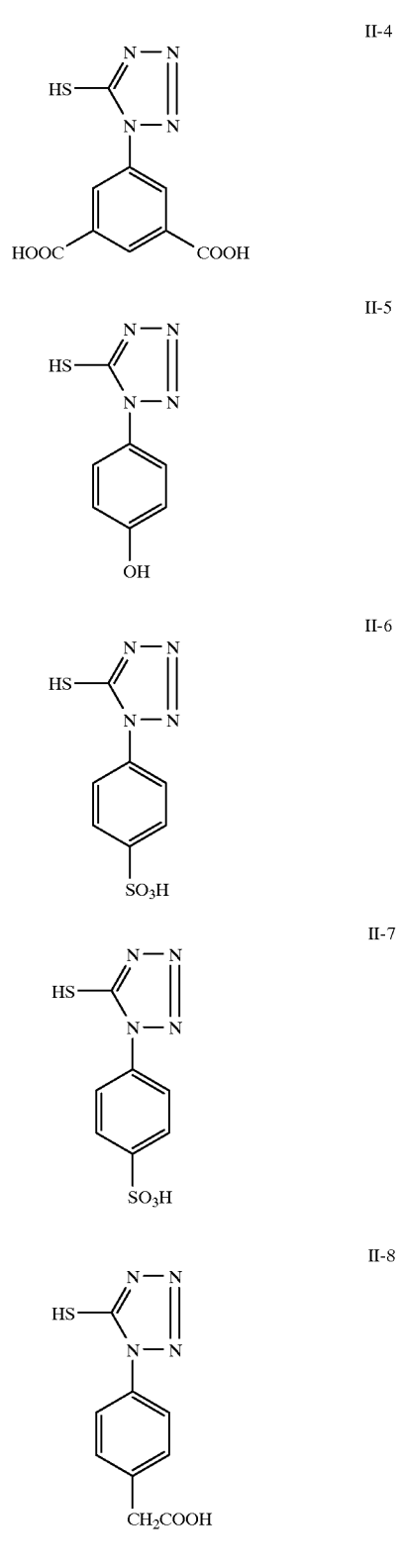

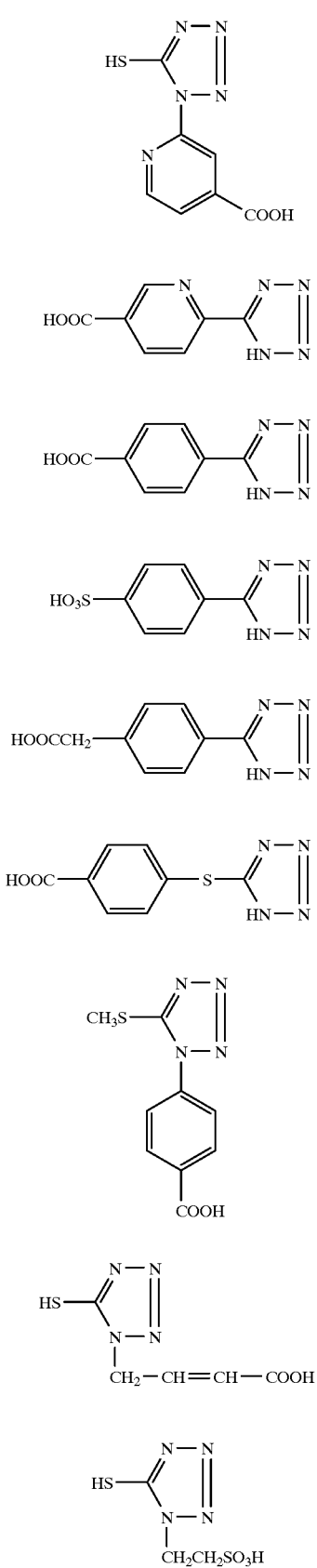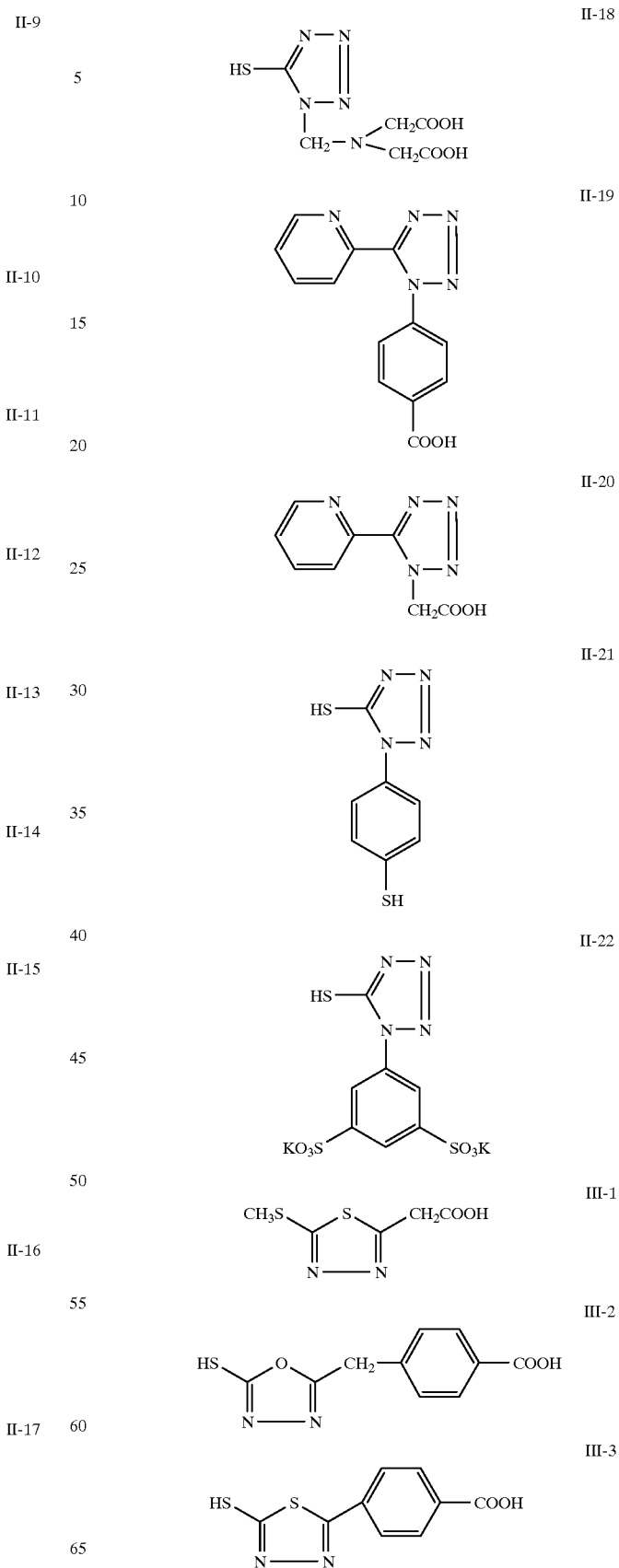

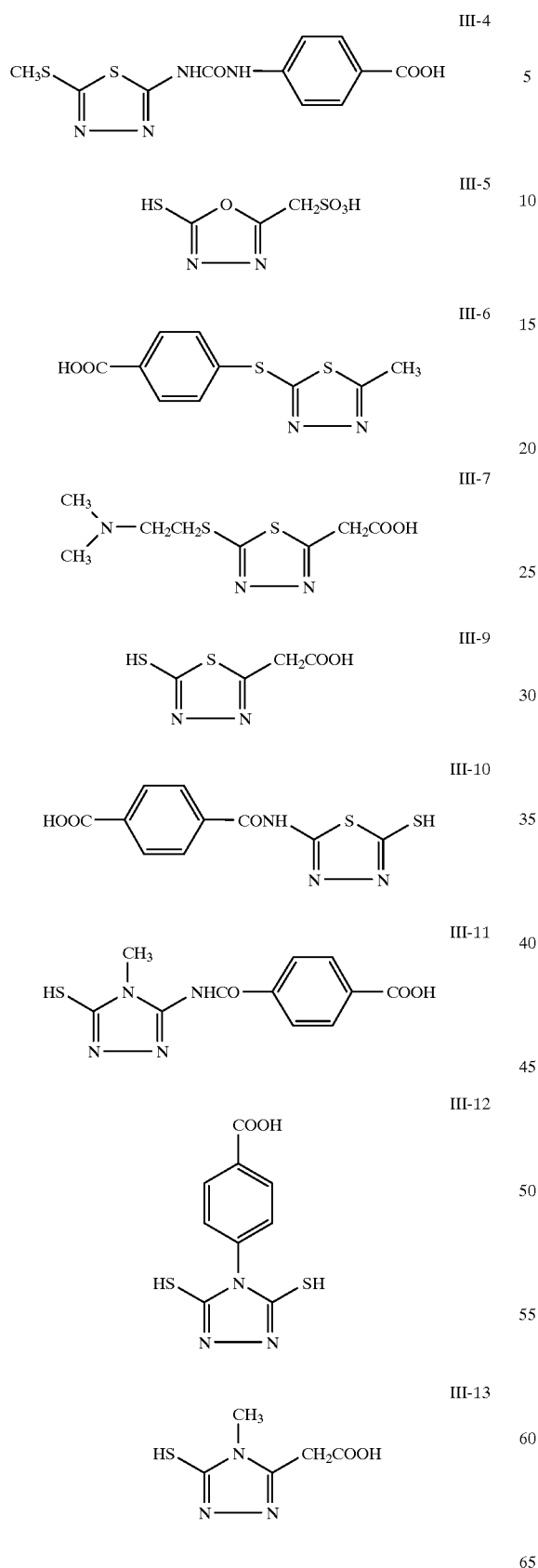
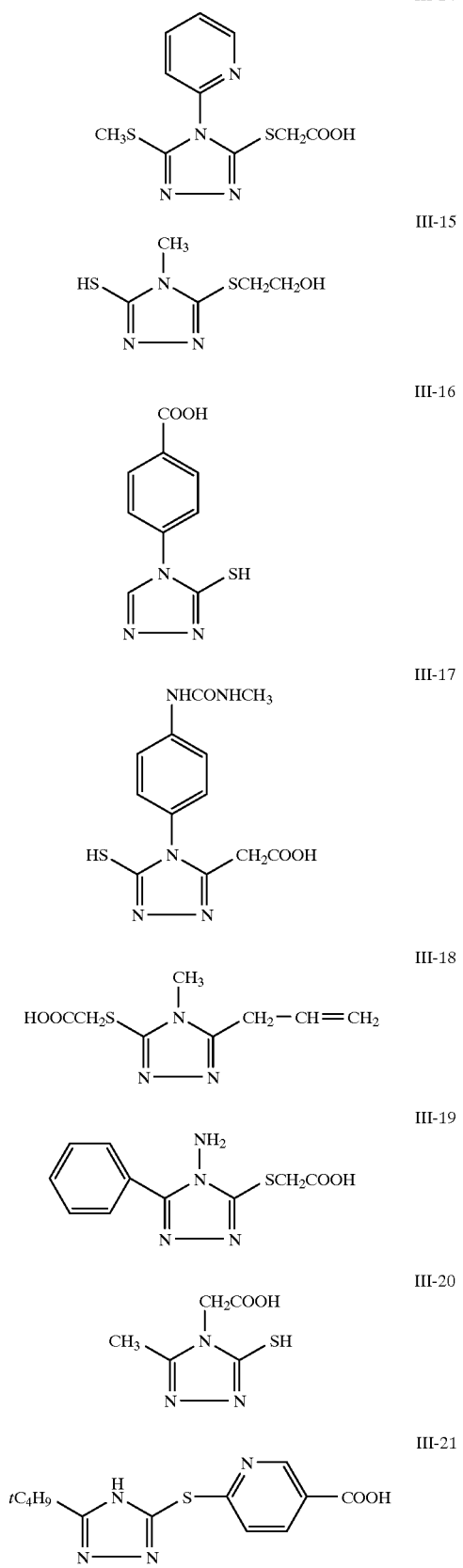

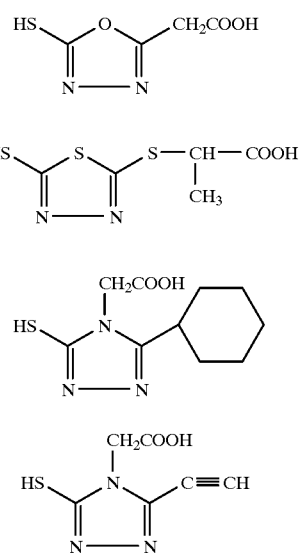

The ultrafiltration in the invention will be explained.

The term "ultrafiltration" herein referred to is defined as described in M. Chenyan, "Ultrafiltration Handbook, Technomic Co., (1986). A membrane is generally used in the ultrafiltration, wherein unnecessary substances pass through the membrane. For example, in the silver halide emulsion manufacturing process, a membrane passing unnecessary salts but not necessary substances such as silver halide grains is used.

The ultrafiltration comprises removing extra soluble salts to wash or concentrate a silver halide emulsion. The ultrafiltration is carried out as follows: A deflocculated silver halide emulsion is incorporated into a ultrafiltration module, and run such that unnecessary salts pass through the membrane to obtain a residual composition comprising a silver halide emulsion and a defloculant. In the invention, the emulsion is concentrated according to the ultrafiltration to be preferably not more than one third by volume of the emulsion before the concentration (ultrafiltration). The selective removal is carried out by pressing a solution against a synthetic semipermeable membrane (ultrafiltration membrane) under pressure, so that molecules not more than a specific size selectively pass through the membrane and molecules exceeding the specific size do not.

In the invention, pressure applied to the emulsion contacting the ultrafiltration membrane is preferably 1 to 10 kg/cm².

The defloculant-containing solution comprising soluble salts and silver halide grains can be supplied to a vessel according to a conventional method. Subsequently, the solution may be supplied through a flow meter to the ultrafiltration module using a pump. The extra salts are removed as a permeation solution, and the rest is circulated in the vessel as a recirculation mode.

In another embodiment, many ultrafiltration modules are aligned in series to supply the rest in the previous module to the inlet of the subsequent module. Before a solution is introduced into each module successively, the solution can be diluted for washing with a solvent. However, re-dilution of the solution is not necessary in view of concentration of the solution.

Thus, various filtration methods are known, and a method employing a ultrafiltration unit will be explained below.

FIG. 1 shows one embodiment of the ultrafiltration unit (including ultrafiltration membrane) in the invention.

In FIG. 1, the silver halide emulsion after physical ripening in the reaction vessel 1 is passed through valve 2, and fed to ultrafiltration unit 5 by pump 3, and desalted by ultrafiltration membrane 6 to remove a waste 15 containing a part of an inorganic ion constituting the salt.

As shown in FIG. 1, a circulation loop is formed by ultrafiltration unit 5 and tubes 4, 8 and 9, wherein the emulsion is circulated by pump 3. The repeated passing through the ultrafiltration unit increases dasalting degree. The pressure of the circulated emulsion is measured by pressure meters 10 and 11.

Ultrafiltration is preferably carried out by circulating a dispersion solution in the reaction vessel which passes through the semipermeable membrane in the ultrafiltration unit to produce the pressure difference necessary to cross the semipermeable membrane. Generally, said membrane comprises small holes which are permeable to molecules having not more than a specific molecular weight but impermeable to molecules having a molecular weight exceeding the specific molecular weight or silver halide grains in the dispersion solution. The membrane is selected from membranes allowing permeation of molecules having a molecular weight of about 500 to 300,000 and preferably about 500 to 80,000.

The ultrafiltration membrane used in the invention is preferably a membrane capable of cutting off a molecule with a molecular weight of 10,000 or less.

The pressure applied to the dispersion solution contacting the ultrafiltration membrane may be broadly varied. In the reaction vessel, the pressure of the dispersion solution contacting the ultrafiltration membrane is about 7.0 kg/cm², the pressure at the outlet of the retentate is about 0.70 kg/cm² or less. The pressure difference across the membrane is typically about 2.8 to 4.2 kg/cm². As a matter of course, the pressure beyond the above pressure ranges can also be applied depending upon the structure of the reaction vessel or the ultrafiltration membrane, the dispersion solution viscosity, the retentate concentration or purity of the desirable retentate.

The membrane used in the ultrafiltration is typically an anisotropic membrane comprising an extremely thin membrane of fine vesicular structure provided on a thicker porous support.

The useful membrane material is selected from various polymers such as polyvinyl chloride, polyvinyl carboxylate, polyvinyl formate, polyvinyl acetate, polyvinyl alcohol, polysulfone, polyvinyl ether, polyacrylamide, polyimide, polyester, polyfluoroalkylene (for example, polytetrafluoroethylene), polyvinylidene fluoride, and celluloses, for example, cellulose or cellulose esters such as cellulose acetate, cellulose butyrate and cellulose acetate butyrate.

Figure 2:
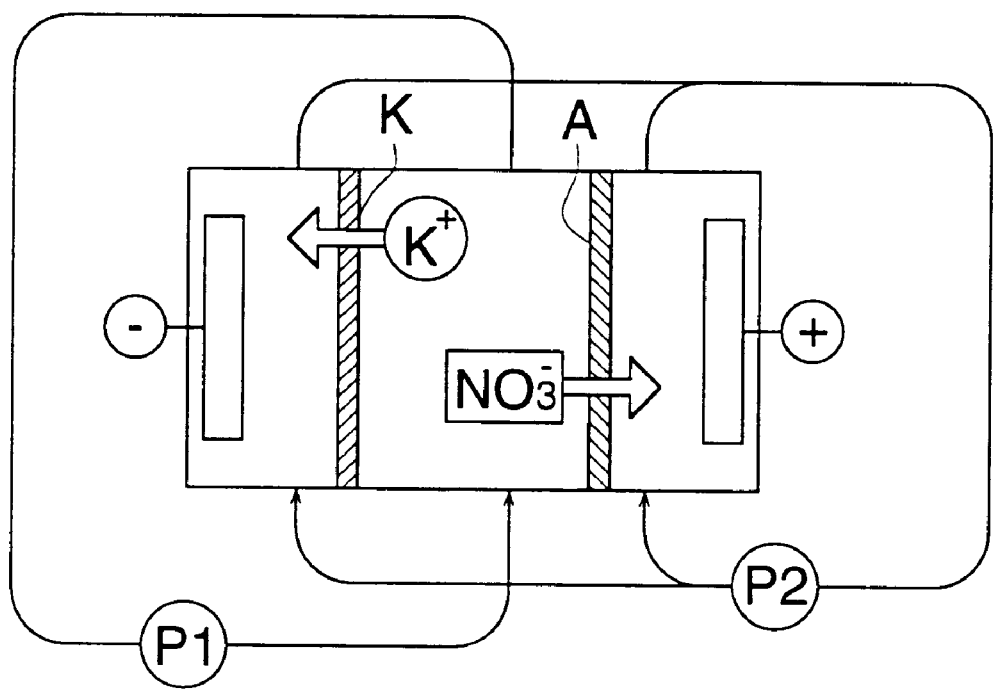
FIG. 2 shows a process of desalting by electrodialysis.

Next, desalting by electrodialysis in the invention will be explained. In FIG. 2, an aqueous salt solution contains a cation (for example, $K^+$) and an anion (for example, $NO_3^-$).

The aqueous solution to be subjected to electrodialysis is circulated by pump P1, and an electrolyte solution is circulated by pump P2.

Membrane K is a cation exchange membrane passing only a cation, and Membrane A is an anion exchange membrane passing only an anion. A cathode (−) is provided on the Membrane K side, and an anode (+) is provided on the Membrane A side. When direct current is supplied, a cation moves towards the cathode through the Membrane K, and an anion moves towards the anode through the Membrane A.

Once a cation moves towards the cathode through the Membrane K and an anion moves towards the anode through the Membrane A, the cation and anion cannot return to the original solution through Membranes K and A, respectively, resulting in desalting.

It is preferable in the invention that electrodialysis is carried out applying DC10V to DC30V.

The ion exchange membranes used in the electrodialysis are available on the market, and are optionally selected according to the usage object.

Figure 3:
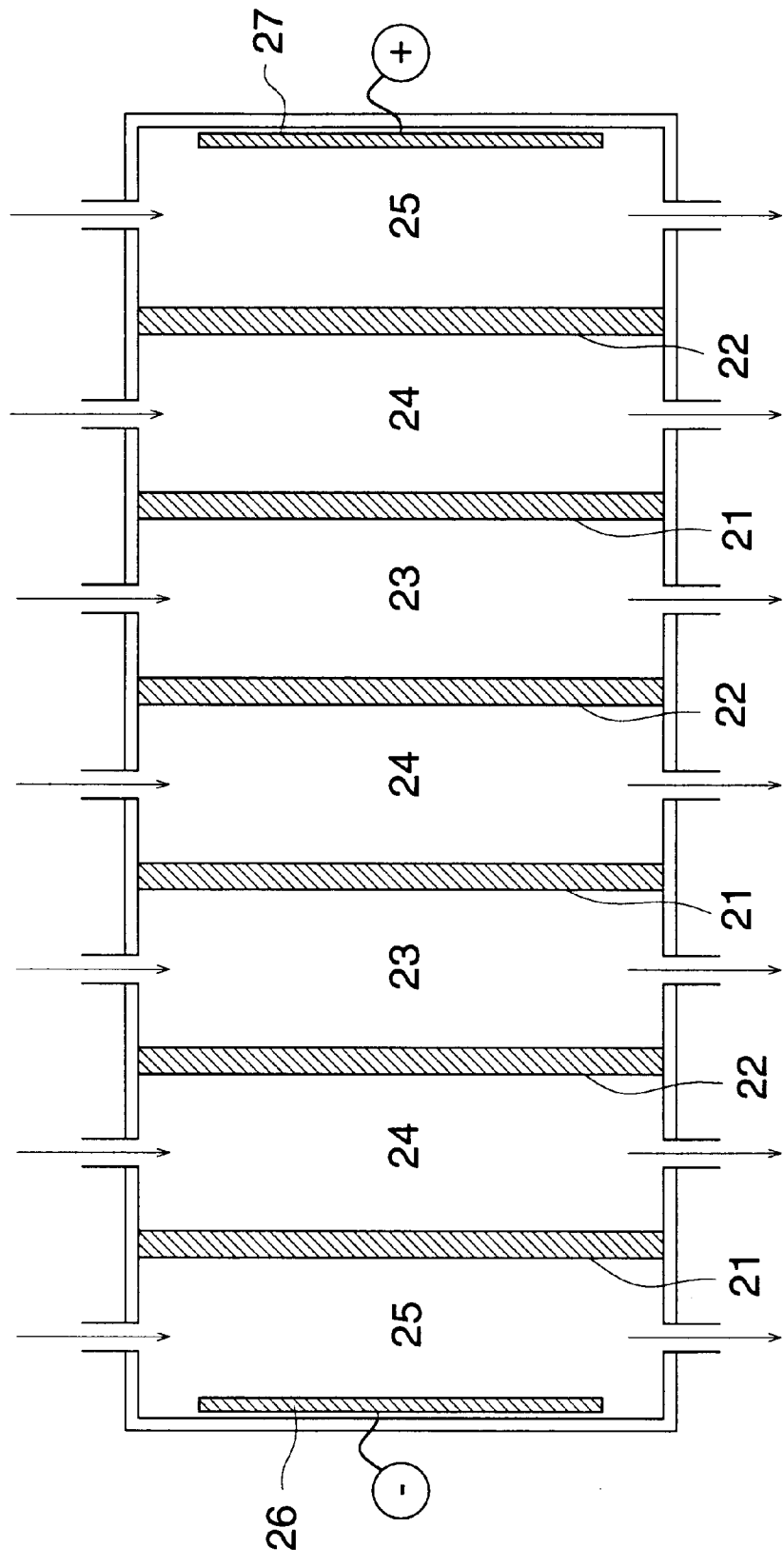
FIG. 3 shows one embodiment of the desalting apparatus.

FIG. 3 shows one embodiment of a desalting apparatus employing an electrodialysis method. In FIG. 3, anion exchange membranes 21 and cation exchange membranes 22 are alternately provided, and silver halide emulsion chambers 23 to which the emulsion is fed by circulation, salt waste chambers 24 in which the removed salt is placed, and electrode chambers 25 in which electrodes (−) 26 and (+) 27 are provided. A silver halide emulsion is charged in silver halide emulsion chambers 23, and an electrolyte solution is charged in salt waste chambers 24 and electrode chambers 25. The emulsion and the electrolyte solution are circulated maintaining at constant temperature. When direct current is supplied, the cation and anion in the silver halide emulsion move towards the salt waste chambers through the cation and anion membranes to obtain an silver halide emulsion removing an unnecessary salt. The electric conductivity of the electrodialyzed emulsion is preferably 1 to 10 mS/cm. The electric conductivity was measured at 40° C. employing CM-40V produced by TOA Electronics Ltd.

The temperature during desalting is preferably 30 to 70° C, and more preferably 30 to 40° C. Dialysis of the emulsion is preferably carried out before ultrafiltration is carried out, and more preferably carried out after 30% of the salt in the emulsion has been removed. In the invention, dialysis and ultrafiltration of the emulsion are most preferably carried out at the same time.

The present inventors have found that the silver halide emulsion, which is prepared by ultrafiltrating or ultrafiltrating and electrodialyzing to desalt or concentrate a silver halide emulsion containing gelatin with a low molecular weight, provides greatly improved sensitivity, graininess and storage stability. The mechanism of these improvement is not clear. It is considered that a lower molecular weight gelatin adsorbed on a silver halide grain surface during the silver halide grain formation is not removed by a conventional flocculation method even after desalting or concentration, and is still adsorbed on the surface, so that stable adsorption on the grain surface of sensitizing dyes, which are added to the emulsion in chemical sensitization carried out after the desalting, is inhibited. In the invention, the silver halide emulsion with the above excellent photographic properties are considered to be obtained, since the lower molecular weight gelatin adsorbed on the grain surface is effectively desorbed by the ultrafiltrating or ultrafiltrating and electrodialyzing.

With regard to a silver halide emulsion, there is referred items described in Research Disclosure 308119 (hereinafter referred to as RD 308119), as shown below.

| Item | Page |
|---|---|
| Iodide system | 993, I-A |
| Preparation method | 993, I-A and 994, E |
| Crystal habit (regular crystal) | 993, I-A |
| Crystal habit (twinned crystal) | 993, I-A |
| Epitaxial | 993, I-A |

-continued

| Item | Page |
|---|---|
| Halide composition (uniform) | 993, I-B |
| Halide composition (nonuniform) | 993, I-B |
| Halide conversion | 994, I-C |
| Halide substitution | 994, I-C |
| Metal doping | 994, I-D |
| Monodispersity | 995, I-F |
| Solvent | 995, I-F |
| Latent image forming position (surface) | 995, I-G |
| Latent image forming position (internal) | 995, I-G |
| Negative-working material | 995, I-H |
| Positive-working material | 995, I-H |
| Blended emulsion | 995, I-J |
| Desalting | 995, II-A |

A silver halide emulsion of the invention may be subjected to physical ripening, chemical ripening or spectral sensitization. Additives used in these processes are described in Research Disclosure Nos. 17643, 18716 and 308119 (hereinafter, denoted as RD 17643, 18716 and 308119), as shown below.

TABLE 1

| Item | RD 308119 | RD 17643 | RD 18716 |
|---|---|---|---|
| Chemical sensitizer | 996 III-A | 23 | 648 |
| Spectral sensitizer | 996 IV-A-A, B, C, D, H, I, J | 23–24 | 648–9 |
| Super sensitizer | 996 IV-A-E, J | 23–24 | 648–9 |
| Fog inhibitor | 998 IV | 24–25 | 649 |
| Stabilizer | 998 IV | 24–25 | 649 |

Further, additives which can be employed in the present invention are also described in the Research Disclosures as shown below.

TABLE 2

| Item | RD 308119 | RD 17643 | RD 18716 |
|---|---|---|---|
| Antistain agent | 1002 VII-I | 25 | 650 |
| Dye image Stabilizer | 1001 VII-J | 25 | |
| Brightener | 998 V | 24 | |
| UV absorbent | 1003 VIII-C XIII-C | 25–26 | |
| Light absorbing agent | 1003 VIII | 25–26 | |
| Light scattering agent | 1003 VIII | | |
| Filter dye | 1003 VIII | | |
| Binder | 1003 IX | 26 | 651 |
| Antistatic agent | 1006 XIII | 27 | 650 |
| Hardener | 1004 X | 26 | 651 |
| Plasticizer | 1006 XII | 27 | 650 |
| Lubricant | 1006 XII | 27 | 650 |
| Surfactant, coating aid | 1005 XI | 26–27 | 650 |
| Matting agent | 1007 XVI | | |
| Developer-in-emulsion | 1011 XX-B | | |

In the present invention, various kinds of couplers can be employed, examples of which are shown below.

TABLE 3

| Item | RD 308119 | RD 17643 |
|---|---|---|
| Yellow coupler | 1001 VII-D | VII C-G |
| Magenta coupler | 1001 VII-D | VII C-G |
| Cyan coupler | 1001 VII-D | VII C-G |
| Colored coupler | 1002 VII-G | VII G |
| DIR coupler | 1001 VII-F | VII F |

TABLE 3-continued

| Item | RD 308119 | RD 17643 |
| --- | --- | --- |
| BAR coupler | 1002 VII-F | |
| PUG-releasing coupler | 1001 VII-F | |
| Alkali-soluble coupler | 1001 VII-E | |

The additives usable in the present invention may be added according to a dispersing method described in RD 308119 XIV.

In the invention, there can be employed supports described in RD 17643 page 28, RD 18716 pages 647–8, RD 308119 XIX.

The photographic light sensitive material of the invention may be provided with a filter layer or interlayer, as described in RD 308119 VII-K.

The photographic light sensitive material of the invention may have any layer structure such as normal layer structure, inverted layer structure or unit layer structure, as described in RD 308119-K The photographic light sensitive material of the invention are applicable to various type color photographic materials including a color negative film for general use or movie, color reversal film for slide or television, color paper, color positive film and color reversal paper.

The photographic material of the invention can be processed in a conventional manner described in RD 17643 page 28–29, RD 18716 page 647 and RD 308119 XIX.

EXAMPLES

The invention will be explained in the examples, but is not limited thereto.

Example 1

Preparation of Seed Emulsion-1

Using a mixing stirrer described in Japanese Patent examined Nos. 58-58288 and 58-58289, an aqueous silver nitrate solution (1.161 mol) and an aqueous solution of potassium bromide and potassium iodide (potassium iodide, 2 mol %) were added to Solution A1 maintained at 35° C. over a period of 2 min. by a double jet method to form nucleuses, while being kept at a silver potential of 0 mV (measured with a silver ion selection electrode with reference to saturated silver-silver chloride electrode). Subsequenrly, the temperature was increased to 60° C. taking 60 min. After the pH was adjusted to 5.0 with an aqueous sodium carbonate solution, an aqueous silver nitrate solution (5.902 mol) and an aqueous solution of potassium bromide and potassium iodide (potassium iodide, 2 mol %) were added thereto over a period of 42 min. by a double jet method, while being kept at a silver potential of 9 mV. After completing the addition, the temperature was lowered to 40° C. and desalting was carried out by a conventional flocculation.

The thus-prepared seed crystal grain emulsion was comprised of silver halide grains having an average grain size (sphere-equivalent diameter) of 0.24 μm and an average aspect ratio of 4.8, not less than 90% of the projected area of total grains being hexagonal tabular grains having a maximum edge ratio of 1.0 to 2.0. This emulsion was denoted as Seed emulsion-1.

| Solution A1: | | |
| --- | --- | --- |
| Ossein gelatin (average molecular weight: 23,000) | 24.2 | g |
| Potassium bromide | 10.8 | g |
| 10% Methanol soln of Compound SY-1 | 6.80 | ml |
| 10% Nitric acid | 114 | ml |
| Water | 9655 | ml |

Compound SY-1:
$HO(CH_2CH_2O)m[CH(CH_3)CH_2O]_{19.8}(CH_2CH_2O)nH$
(n+m=9.77)

Preparation of silver iodide fine grain emulsion SMC-1

To 5 liters of a 6.0 wt % gelatin aqueous solution containing 0.06 mol of potassium iodide, an aqueous silver nitrate solution (7.06 mol) and an aqueous possium iodide solution (7.06 mol), each 2 liters were added with vigorously stirring over a period of 10 min., while the pH was controlled at 2.0 with nitric acid and the temperature was kept at 40° C. After completing the grain formation, the pH was adjusted to 5.0 using an aqueous solution of sodium carbonate. The resulting emulsion was comprised of silver iodide fine grains having an average grain size of 0.05 μm. This emulsion was denoted SMC-1.

Growth of Seed emulsion-1

Seven hundred ml of a 4.5 wt % inert gelatin aqueous solution containing 0.178 mol equivalent Seed emulsion-1 and 0.5 ml of a 10% methanol solution of Compound SY-1 were maintained at 75° C., and after the pAg and pH were adjusted to 8.4 and 5.0, respectively, grain formation was carried out with stirring by a double jet method according to the following sequence.

1) An aqueous silver nitrate solution (2.121 mol), 0.174 mol of SMC-1 and an aqueous potassium bromide solution were added, while being kept at a pAg of 8.4 and pH of 5.0.
2) Subsequently, the temperature of the solution was lowered to 60° C. and the pAg was adjusted to 9.8. Then, 0.071 mol of SMC-1 was added thereto and ripening was carried out further for 2 min.
3) An aqueous silver nitrate solution (0.959 mol), 0.030 mol of SMC-1 and an aqueous potassium bromide solution were added, while being kept at a pAg of 9.8 and pH of 5.0.

During the course of grain formation, each solution was added at an optimal flowing rate not so as to form new nuclear grains and cause Ostwald ripening.

The resulting emulsion was divided into three parts, maintained at 40° C., and Emulsions EM-1, EM-2 and EM-3 were prepared as follows:

Preparation of EM-1

One of the divided emulsions was desalted and concentrated by a conventional flocculation method not to cause Ostwald ripening, redispersed adding gelatin thereto, and the pAg and pH were each adjusted to 8.0 and 5.8, respectively.

The resulting emulsion was shown to be comprised of tabular grains having an average cube-equivalent edge length of 0.65 μm and an average aspect ratio of 8.1, and a coefficient of variation of a projected circle equivalent diameter of 19%. According to the electron micrograph, there was observed not less than 80% (by number) of the grains, each having 5 or more dislocation lines in each of the fringe portion and inner portion thereof.

Preparation of EM-2

Another one of the divided emulsions was desalted and concentrated by ultrafiltration to be one third by volume of the emulsion before the ultrafiltration not to cause Ostwald ripening, redispersed adding gelatin thereto, and the pAg and pH were each adjusted to 8.0 and 5.8, respectively. The ultrafiltration membrane cuts off a molecule with a molecular weight of 10,000, and Microza LF labomodule SLP-1053 produced by Asahi Kasei Co., Ltd. was employed.

The resulting emulsion was shown to be comprised of tabular grains having an average cube-equivalent edge length of 0.65 μm and an average aspect ratio of 8.1, and a coefficient of variation of a projected circle equivalent diameter of 19%. According to the electron micrograph, there was observed not less than 80% (by number) of the grains, each having 5 or more dislocation lines in each of the fringe portion and inner portion thereof.

The desalting amount in the ultrafiltration was measured by monitoring reduction of conductivity of the emulsion. In this example, ultrafiltration was completed when emulsion conductivity was 5% or less of the conductivity of the emulsion before the ultrafiltration.

Preparation of EM-3

Still another one of the divided emulsions was desalted and concentrated by carrying out ultrafiltration and electrodialysis at the same time to be one third by volume of the emulsion before the ultrafiltration not to cause Ostwald ripening, redispersed adding gelatin thereto, and the pAg and pH were each adjusted to 8.0 and 5.8, respectively. The ultrafiltration membrane used in the preparation of EM-2 above was employed.

The resulting emulsion was shown to be comprised of tabular grains having an average cube-equivalent edge length of 0.65 μm and an average aspect ratio of 8.1, and a coefficient of variation of a projected circle equivalent diameter of 19%. According to the electron micrograph, there was observed not less than 80% (by number) of the grains, each having 5 or more dislocation lines in each of the fringe portion and inner portion thereof.

The desalting amount in the ultrafiltration and/or electrodialysis was measured by monitoring reduction of conductivity of the emulsion. In this example, ultrafiltration and electrodialysis were completed when emulsion conductivity was 2 mS/cm. The electrodialysis was carried out applying DC 25 V.

Preparation of Emulsions EM-4 through EM-15

Seed emulsion was prepared in the same manner as in Seed emulsion-1, except that the molecular weight of gelatin used in the Solution Al was varied as shown below, and grown in the same manner as in Seed emulsion-1. The resulting emulsions were divided into three parts and processed in the same manner as in Emulsions EM-1, EM-2 and EM-3 to obtain Emulsions EM-4 through EM-15. The molecular weight of the gelatins herein used were lowered by enzyme decomposition (as described previously) of gelatin with an average molecular weight of 100,000, which was used in the preparation of EM-4 and EM-5. The molecular weight of gelatin was measured by gel permeation chromatography.

| Emulsion | Average Molecular Weight of Gelatin | Desalting and Concentration Methods | Average Grain Size (μm) | Average Aspect Ratio | Remarks |
|---|---|---|---|---|---|
| EM-1 | 23,000 | A | 0.65 | 8.1 | Comp. |
| EM-2 |  | B | 0.65 | 8.1 | Inv. |
| EM-3 |  | C | 0.65 | 8.1 | Inv. |
| EM-4 | 100,000 | A | 0.65 | 8.1 | Comp. |
| EM-5 |  | C | 0.65 | 8.1 | Comp. |
| EM-6 | 65,000 | A | 0.65 | 8.2 | Comp. |
| EM-7 |  | C | 0.65 | 8.2 | Inv. |
| EM-8 | 38,000 | A | 0.65 | 8.2 | Comp. |
| EM-9 |  | C | 0.65 | 8.2 | Inv. |
| EM-10 | 9,000 | A | 0.65 | 8.3 | Comp. |
| EM-11 |  | C | 0.65 | 8.3 | Inv. |
| EM-12 | 2,500 | A | 0.65 | 8.1 | Comp. |
| EM-13 |  | C | 0.65 | 8.1 | Inv. |
| EM-14 | 500 | A | 0.65 | 8.3 | Comp. |
| EM-15 |  | C | 0.65 | 8.3 | Inv. |

Comp.: Comparative, Inv.: Invention

In the above, Concentration method A represents a conventional flocculation method, Concentration method B represents an ultrafiltration method, and Concentration method C represents an ultrafiltration and dialysis method.

Preparation of light sensitive material

The thus obtained emulsions EM-1 through EM-15 were optimally gold and sulfur sensitized according to the conventional manner.

To each emulsion were added a stabilizer (ST-1) and fog restrainer (AF-1) in an amount of 500 mg and 10 mg per mol of silver halide, respectively.

The color photographic light sensitive material samples 1 to 15 having the following layer structure on a cellulose triacetate support were prepared, except that each of the silver halide emulsions EM-1 through EM-15 prepared as above was employed instead of the silver iodobromide emulsion (average grain size of 0.65, an iodide content of 8 mol %) in the 8th layer, respectively. In the following layer structure, the coating amount of silver halide or colloidal silver was converted to silver, being expressed in g per $m^2$ of the photographic material. The coating amount of couplers and additives was expressed in $g/m^2$. With respect to a sensitizing dye, its coating amount was expressed in mol per mol of silver halide contained in the same layer.

| 1st layer; Antihalation layer | |
|---|---|
| Black colloidal silver | 0.16 |
| UV absorbent (UV-1) | 0.20 |
| High boiling solvent (OIL-1) | 0.16 |
| Gelatin | 1.24 |
| 2nd layer; Interlayer | |
| High boiling solvent (OIL-2) | 0.17 |
| Gelatin | 1.27 |
| 3rd layer; Low speed red-sensitive layer | |
| Silver iodobromide emulsion (Av. grain size of 0.38 μm, 7 mol % iodide) | 0.50 |
| Silver iodobromide emulsion (Av. grain size of 0.27 μm, 2 mol % iodide) | 0.21 |
| Sensitizing dye (SD-1) | $2.8 \times 10^{-4}$ |
| Sensitizing dye (SD-2) | $1.9 \times 10^{-4}$ |
| Sensitizing dye (SD-3) | $1.9 \times 10^{-5}$ |
| Sensitizing dye (SD-4) | $1.0 \times 10^{-4}$ |

-continued

| | |
|---|---|
| Cyan coupler (C-1) | 0.48 |
| Cyan coupler (C-2) | 0.14 |
| Colored cyan coupler (CC-1) | 0.021 |
| DIR compound (D-1) | 0.020 |
| High boiling solvent (OIL-1) | 0.53 |
| Gelatin | 1.30 |
| 4th layer; Medium speed red-sensitive layer | |
| Silver iodobromide emulsion (Av. grain size of 0.65 μm, 8 mol % iodide) | 0.62 |
| Silver iodobromide emulsion (Av. grain size of 0.38 μm, 7 mol % iodide) | 0.27 |
| Sensitizing dye (SD-1) | $2.3 \times 10^{-4}$ |
| Sensitizing dye (SD-2) | $1.2 \times 10^{-4}$ |
| Sensitizing dye (SD-3) | $1.6 \times 10^{-5}$ |
| Sensitizing dye (SD-4) | $1.2 \times 10^{-4}$ |
| Cyan coupler (C-1) | 0.15 |
| Cyan coupler (C-2) | 0.18 |
| Colored cyan coupler (CC-1) | 0.030 |
| DIR compound (D-1) | 0.013 |
| High boiling solvent (OIL-1) | 0.30 |
| Gelatin | 0.93 |
| 5th layer; High speed red-sensitive layer | |
| Silver iodobromide emulsion (Av. grain size of 0.90 μm, 8 mol % iodide) | 1.27 |
| Sensitizing dye (SD-1) | $1.3 \times 10^{-4}$ |
| Sensitizing dye (SD-2) | $1.3 \times 10^{-4}$ |
| Sensitizing dye (SD-3) | $1.6 \times 10^{-5}$ |
| Cyan coupler (C-2) | 0.12 |
| Colored cyan coupler (CC-1) | 0.013 |
| High boiling solvent (OIL-1) | 0.14 |
| Gelatin | 0.91 |
| 6th layer; Interlayer | |
| High boiling solvent (OIL-2) | 0.11 |
| Gelatin | 0.80 |
| 7th layer; Low speed green-sensitive layer | |
| Silver iodobromide emulsion (Av. grain size of 0.38 μm, 8 mol % iodide) | 0.61 |
| Silver iodobromide emulsion (Av. grain size of 0.27 μm, 2 mol % iodide) | 0.20 |
| Sensitizing dye (SD-4) | $7.4 \times 10^{-5}$ |
| Sensitizing dye (SD-5) | $6.6 \times 10^{-4}$ |
| Magenta coupler (M-1) | 0.18 |
| Magenta coupler (M-2) | 0.44 |
| Colored magenta coupler (CM-1) | 0.12 |
| DIR compound (D-2) | 0.02 |
| High boiling solvent (OIL-2) | 0.75 |
| Gelatin | 1.95 |
| 8th layer; Medium speed green-sensitive layer | |
| Silver iodobromide emulsion (Av. grain size of 0.65 μm, 8 mol % iodide) | 0.87 |
| Sensitizing dye (SD-6) | $2.5 \times 10^{-4}$ |
| Sensitizing dye (SD-7) | $2.5 \times 10^{-4}$ |
| Magenta coupler (M-1) | 0.060 |
| Magenta coupler (M-2) | 0.13 |
| Colored magenta coupler (CM-1) | 0.070 |
| DIR compound (D-2) | 0.025 |
| High boiling solvent (OIL-2) | 0.50 |
| Gelatin | 1.00 |
| 9th layer; High speed green-sensitive layer | |
| Silver iodobromide emulsion (Av. grain size of 0.9 μm, 8 mol % iodide) | 1.27 |
| Sensitizing dye (SD-6) | $7.1 \times 10^{-5}$ |
| Sensitizing dye (SD-7) | $7.1 \times 10^{-5}$ |
| Sensitizing dye (SD-8) | $7.1 \times 10^{-5}$ |
| Magenta coupler (M-2) | 0.084 |
| Magenta coupler (M-3) | 0.064 |
| Colored magenta coupler (CM-1) | 0.012 |
| High boiling solvent (OIL-1) | 0.27 |
| High boiling solvent (OIL-2) | 0.012 |
| Gelatin | 1.00 |
| 10th layer; Yellow filter layer | |
| Yellow colloidal silver | 0.08 |
| Antistain agent (SC-1) | 0.15 |
| Formalin scavenger (HS-1) | 0.20 |
| High boiling solvent (OIL-2) | 0.19 |
| Gelatin | 1.10 |
| 11th layer; Interlayer | |
| Formalin scavenger (HS-1) | 0.20 |
| Gelatin | 0.60 |
| 12th layer; Low speed blue-sensitive layer | |
| Silver iodobromide emulsion (Av. grain size of 0.65 μm, 8 mol % iodide) | 0.07 |
| Silver iodobromide emulsion (Av. grain size of 0.38 μm, 7 mol % iodide) | 0.16 |
| Silver iodobromide emulsion (Av. grain size of 0.27 μm, 2 mol % iodide) | 0.10 |
| Sensitizing dye (SD-8) | $4.9 \times 10^{-4}$ |
| Yellow coupler (Y-1) | 0.80 |
| DIR compound (D-3) | 0.15 |
| High boiling solvent (OIL-2) | 0.30 |
| Gelatin | 1.20 |
| 13th layer; High speed blue-sensitive layer | |
| Silver iodobromide emulsion (Av. grain size of 0.65 μm, 8 mol % iodide) | 0.95 |
| Sensitizing dye (SD-8) | $7.3 \times 10^{-5}$ |
| Sensitizing dye (SD-9) | $2.8 \times 10^{-5}$ |
| Yellow coupler (Y-1) | 0.15 |
| High boiling solvent (OIL-2) | 0.046 |
| Gelatin | 0.80 |
| 14th layer; First protective layer | |
| Silver iodobromide emulsion (Av. grain size of 0.08 μm, 1.0 mol % iodide) | 0.40 |
| UV absorbent (UV-1) | 0.065 |
| UV absorbent (UV-2) | 0.10 |
| High boiling solvent (OIL-1) | 0.07 |
| High boiling solvent (OIL-3) | 0.07 |
| Formalin scavenger (HS-1) | 0.40 |
| Gelatin | 1.31 |
| 15th layer; Second protective layer | |
| Alkali-soluble matting agent (Av. particle size: 2 μm) | 0.15 |
| Polymethylmethacrylate (Av. particle size: 3 μm) | 0.04 |
| Slipping agent (WAX-1) | 0.04 |
| Gelatin | 0.55 |

In addition to the above composition were added coating aids (SU-1 and 2), viscosity-adjusting agent (V-1), Hadeners (H-1 and 2), stabilizer (ST-1), fog restrainer (AF-1), dyes (AI-1 and 2), AF-2 comprising two kinds of weight average molecular weights of 10,000 and 1.100,000 and antimold (DI-1). The addition amount of DI-1 was 9.4 g/m².

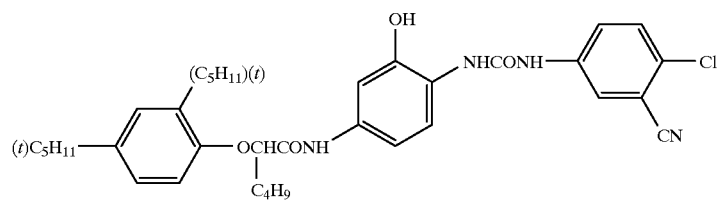
C-1
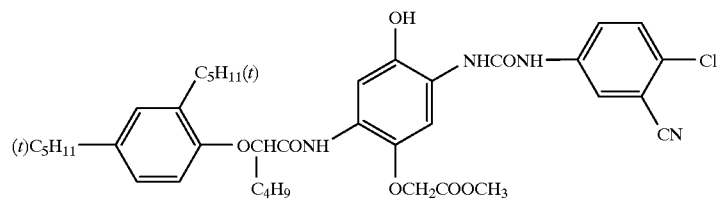
C-2
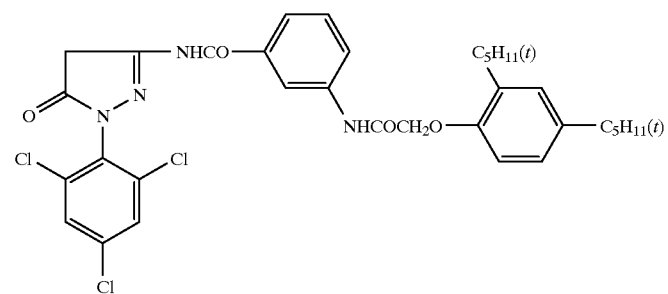
M-1
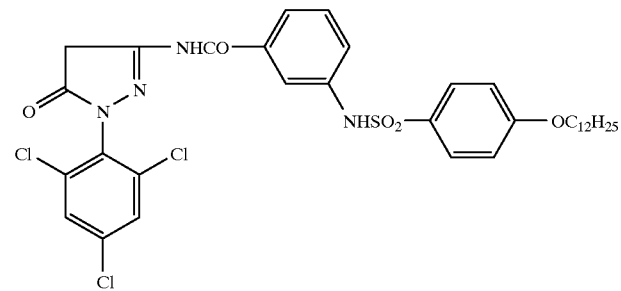
M-2
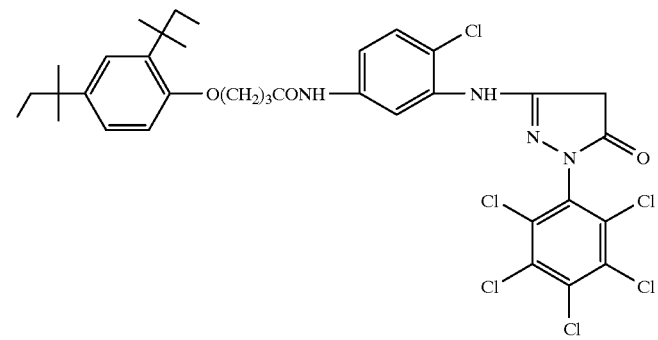
M-3

-continued
Y-1
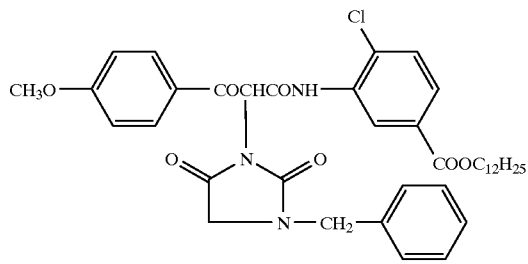
CC-1
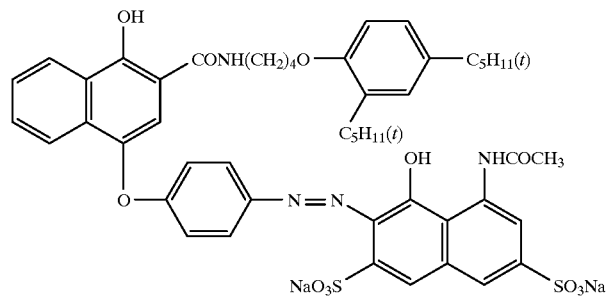
CM-1
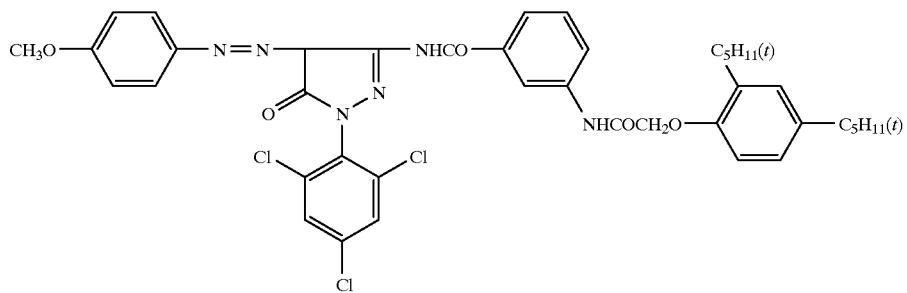
D-1
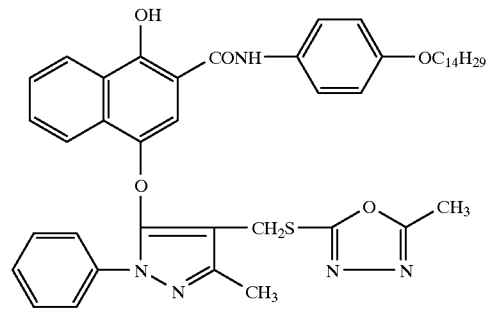
D-2
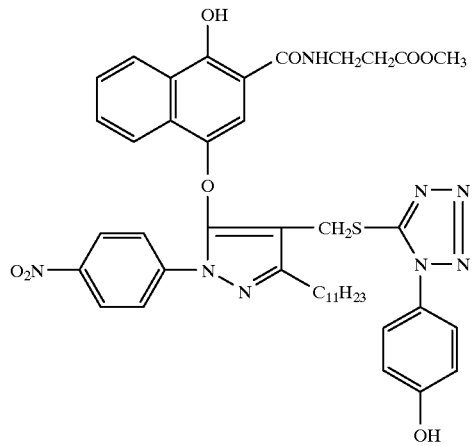

-continued

D-3

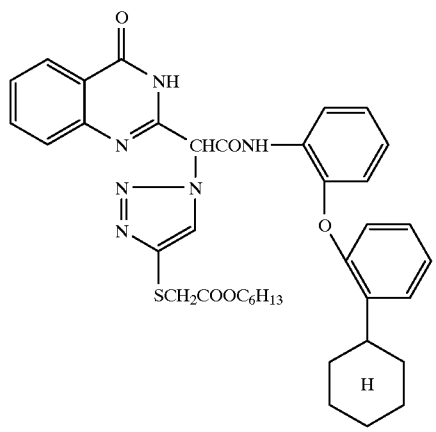

Oil-1

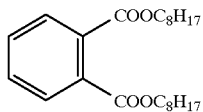

Oil-2

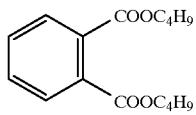

Oil-3

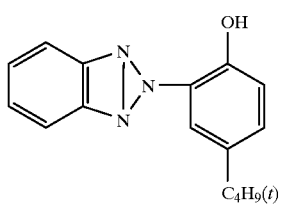

SC-1

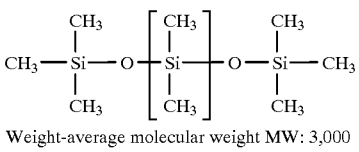

UV-1

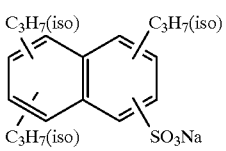

UV-2

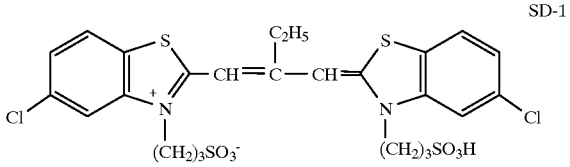

WAX-1

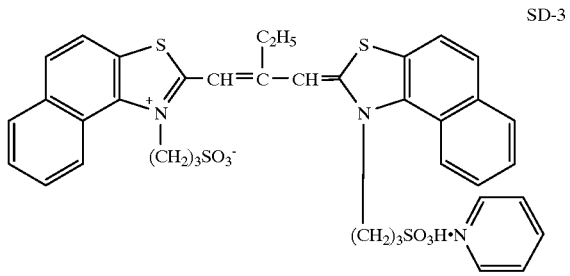

Weight-average molecular weight MW: 3,000

Su-1

NaO₃S—CHCOOC₈H₁₇
         |
         CH₂COOC₈H₁₇

Su-2

C₃H₇(iso), C₃H₇(iso), C₃H₇(iso), SO₃Na substituted naphthalene

HS-1

2,4-dioxoimidazolidine

SD-1

5-Cl benzothiazole dimethine dye with (CH₂)₃SO₃⁻ and (CH₂)₃SO₃H, C₂H₅ bridge

SD-2

5-Cl benzoxazole / 5-Cl benzothiazole dye with (CH₂)₃SO₃⁻ and C₂H₅, C₂H₅ bridge

SD-3 naphtho-thiazole dye with (CH₂)₃SO₃⁻ and (CH₂)₃SO₃H·pyridine, C₂H₅ bridge

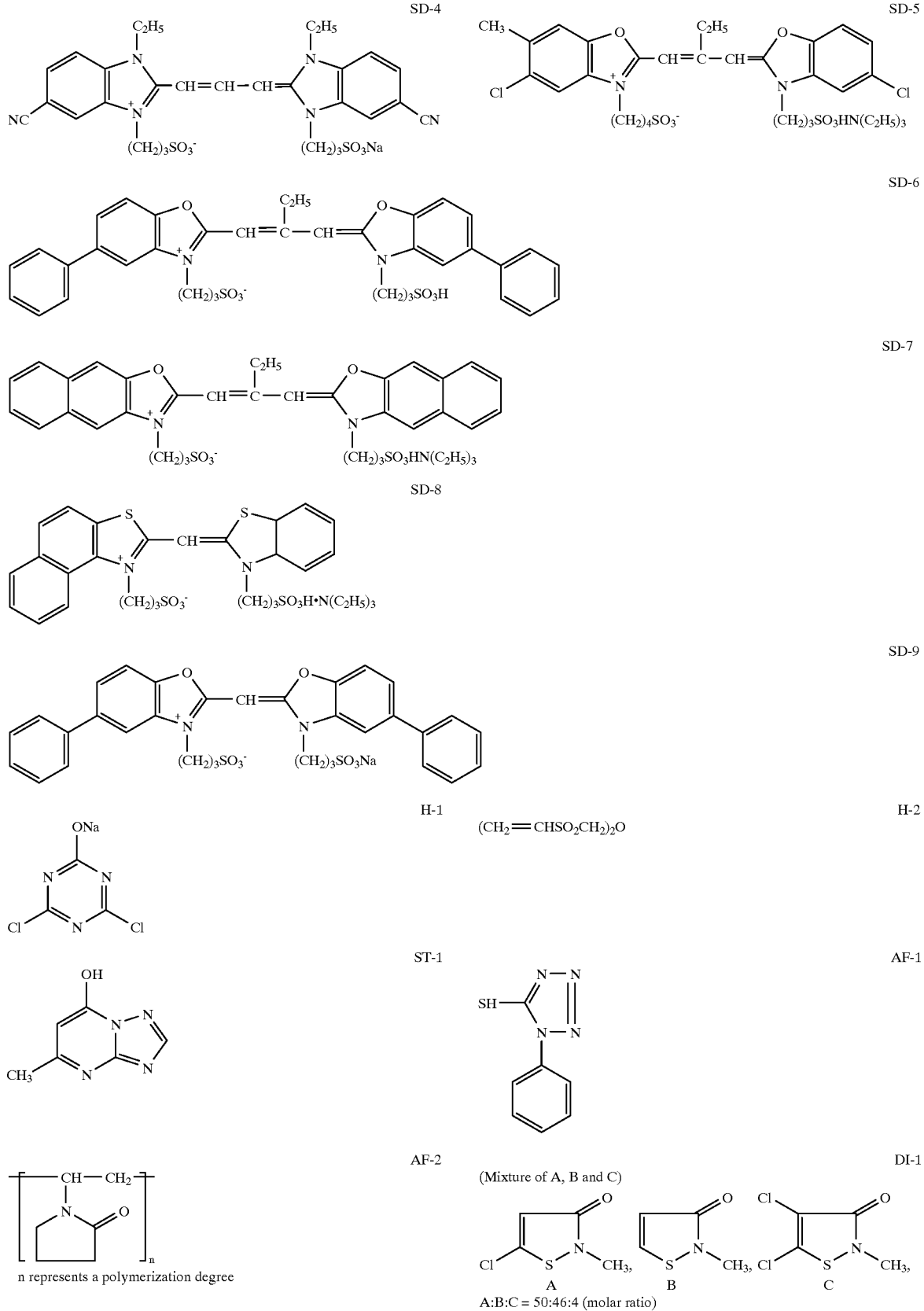

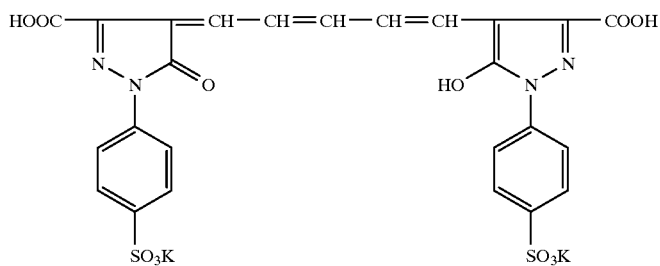

AI-1

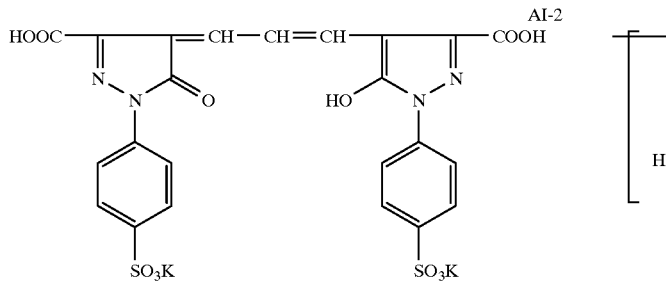

AI-2

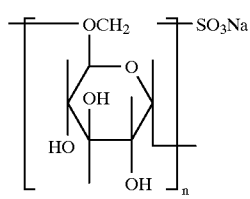

V-1

The resulting light sensitive material samples were wedge exposed for 1/200 seconds through a glass filter (Y-48, product by Toshiba) using a light source having a color temperature of 5400° K and processed according to the following processing steps.

(Processing Steps)

| Processing Step | Processing Time | Processing Temperature | Replenishing Amount* |
|---|---|---|---|
| Color developing | 3 min. 15 sec. | 38 ± 0.3° C. | 780 ml |
| Bleaching | 45 sec. | 38 ± 2.0° C. | 150 ml |
| Fixing | 1 min. 30 sec. | 38 ± 2.0° C. | 830 ml |
| Stabilizing | 60 sec. | 38 ± 5.0° C. | 830 ml |
| Drying | 1 min. | 55 ± 5.0° C. | — |

*Replenishing amount is an amount per $m^2$ of light sensitive material processed.

A color developer, a bleach, a fixer, a stabilizer and their respective replenishers as shown below were used.

Color developer and color developer replenisher

| | Developer | | Developer Replenisher | |
|---|---|---|---|---|
| Water | 800 | ml | 800 | ml |
| Potassium carbonate | 30 | g | 35 | g |
| Sodium hydrogencarbonate | 2.5 | g | 3.0 | g |
| Potassium sulfite | 3.0 | g | 5.0 | g |
| Sodium bromide | 1.3 | g | 0.4 | g |
| Potassium iodide | 1.2 | mg | — | |
| Hydroxylamine sulfate | 2.5 | g | 3.1 | g |
| Sodium chloride | 0.6 | g | — | |
| 4-Amino-3-methyl-N-ethyl-N-(β-hydroxyethyl)aniline sulfate | 4.5 | g | 6.3 | g |
| Diethylene triamine pentaacetic acid | 3.0 | g | 3.0 | g |
| Potassium hydroxide | 1.2 | g | 2.0 | g |

Water was added to make 1 liter, and the developer was regulated to pH 10.06 and the developer replenisher was regulated to pH 10.18 by the use of potassium hydroxide or a 20% surfuric acid solution.

Bleach and bleach replenisher

| | Bleach | | Bleach Replenisher | |
|---|---|---|---|---|
| Water | 700 | ml | 700 | ml |
| Ferric (III) ammonium of 1,3-diaminopropane tetraacetic acid | 125 | g | 175 | g |
| Ethylenediamine tetraacetic acid | 2 | g | 2 | g |
| Sodium nitrate | 40 | g | 50 | g |
| Ammonium bromide | 150 | g | 200 | g |
| Glacial acetic acid | 40 | g | 56 | g |

The bleacher was regulated to pH 4.4 and the bleach replenisher was regulated to pH 4.0 by the use of aqueous ammonia or glacial acetic acid, and water was added to make 1 liter, respectively.

Fixer and fixer replenisher

| | Fixer | | Fixer Replenisher | |
|---|---|---|---|---|
| Water | 800 | ml | 800 | ml |
| Ammonium thiocyanate | 120 | g | 150 | g |
| Ammonium thiosulfate | 150 | g | 180 | g |
| Sodium sulfite | 15 | g | 20 | g |
| Ethylenediamine tetraacetic acid | 2 | g | 2 | g |

The fixer was regulated to pH 6.5 and the fixer replenisher to pH 4.4 by the use of aqueous ammonia or glacial acetic acid, and then, water was added to make 1 liter.

Stabilizer and stabilizer replenisher

| | | |
|---|---|---|
| Water | 900 | ml |
| Adduct of p-octylphenol with 10 mol of ethyleneoxide | 2.0 | g |
| Dimethylol urea | 0.5 | g |
| Hexamethylene tetraamine | 0.2 | g |
| 1,2-Benzisothiazoline-3-on | 0.1 | g |
| Siloxane (L-77 produced by UCC) | 0.1 | g |
| Aqueous ammonia | 0.5 | ml |

The pH was regulated to 8.5 by the use of aqueous ammonia or a 50% sulfuric acid solution, and then, water was added to make 1 liter.

The processed samples were evaluated for relative sensitivity and graininess employing a green light. The results are shown below.

Sensitivity was represented by a reciprocal of exposure necessary to give a green density of fog plus 0.15, and relative sensitivity of the samples was represented by sensitivity relative to sensitivity of sample No. 1 being 100. (The greater the value is, the higher sensitivity.) Graininess was represented by standard deviation (RMS value) of density variations occurred when scanning measured with a microdensitometer having a scanning area of 250 $\mu m^2$, and relative graininess of the samples was represented by graininess relative to that of sample No. 1 being 100. (The smaller the value is, the better graininess.)

| Sample No. | Emulsion | Relative sensitivity | Graininess | Remarks |
| --- | --- | --- | --- | --- |
| 1 | EM-1 | 100 | 100 | Comparative |
| 2 | EM-2 | 119 | 86 | Invention |
| 3 | EM-3 | 124 | 84 | Invention |
| 4 | EM-4 | 101 | 101 | Comparative |
| 5 | EM-5 | 100 | 102 | Comparative |
| 6 | EM-6 | 101 | 100 | Comparative |
| 7 | EM-7 | 114 | 90 | Invention |
| 8 | EM-8 | 101 | 99 | Comparative |
| 9 | EM-9 | 119 | 87 | Invention |
| 10 | EM-10 | 98 | 100 | Comparative |
| 11 | EM-11 | 115 | 89 | Invention |
| 12 | EM-12 | 99 | 101 | Comparative |
| 13 | EM-13 | 112 | 90 | Invention |
| 14 | EM-14 | 98 | 100 | Comparative |
| 15 | EM-15 | 109 | 91 | Invention |

As is apparent from the above results, the light sensitive materials employing the silver halide emulsion prepared by the method of the invention show superior results in sensitivity and graininess as compared to those employing the comparative emulsion.

Example 2

The color photographic light sensitive material samples prepared in Example 1 were stored under the following two conditions, and then processed and evaluated in the same manner as in Example 1.

Condition A: the samples were stored for four days at 65° C. and 30% RH.

Condition B: the samples were stored for four days at 65° C. and 80% RH.

The results are shown below. Relative sensitivity and graininess were represented relative to sample No. 1 defined sensitivity as being 100 and graininess as being 100, respectively.

| | | Condition A | | Condition B | | |
| --- | --- | --- | --- | --- | --- | --- |
| Sample No. | Emulsion No. | Relative Sensitivity | Graininess | Relative Sensitivity | Graininess | Remarks |
| 1 | EM-1 | 73 | 119 | 63 | 128 | Comparative |
| 2 | EM-2 | 107 | 103 | 101 | 111 | Invention |
| 3 | EM-3 | 112 | 101 | 105 | 109 | Invention |
| 4 | EM-4 | 71 | 121 | 61 | 130 | Comparative |
| 5 | EM-5 | 71 | 122 | 62 | 128 | Comparative |
| 6 | EM-6 | 72 | 120 | 62 | 128 | Comparative |
| 7 | EM-7 | 103 | 108 | 96 | 117 | Invention |
| 8 | EM-8 | 70 | 119 | 64 | 127 | Comparative |
| 9 | EM-9 | 108 | 103 | 102 | 112 | Invention |
| 10 | EM-10 | 71 | 121 | 63 | 130 | Comparative |
| 11 | EM-11 | 104 | 106 | 98 | 116 | Invention |
| 12 | EM-12 | 69 | 120 | 61 | 129 | Comparative |
| 13 | EM-13 | 102 | 108 | 95 | 117 | Invention |
| 14 | EM-14 | 72 | 121 | 60 | 128 | Comparative |
| 15 | EM-15 | 98 | 109 | 93 | 118 | Invention |

As is apparent from the above results, the light sensitive materials employing the silver halide emulsion prepared by the method of the invention show superior results in sensitivity and graininess as compared to those employing the comparative emulsion, even when stored under conditions A and B. Further, the phoptographic properties of the inventive samples are less fluctuated after the storage.

Example 3

The fifteen color photographic light sensitive material samples were prepared in the same manner as in Example 1, except that each of the silver halide emulsions EM-1 through EM-15 subjected to optimal chemical and spectral sensitization, was employed in the 13th layer (high speed blue-sensitive layer) instead of the silver iodobromide emulsion (average grain size of 0.65, an iodide content of 8 mol %), respectively.

The resulting samples were processed in the same manner as in Example 1, and evaluated for relative sensitivity and graininess employing a blue light.

As a result, the light sensitive materials employing the silver halide emulsion prepared by the method of the invention exhibited superior results in sensitivity and graininess as compared to those employing the comparative emulsion.

What is claimed is:

1. A method of manufacturing a silver halide emulsion comprising:

ultrafiltrating a silver halide emulsion containing silver halide grains and gelatin having an average molecular weight of 500 to 70,000, by means of an ultrafiltration unit having an ultrafiltration membrane, whereby the emulsion is desalted and concentrated; and electrodialyzing the silver halide emulsion containing silver halide grains and gelatin having an average molecular weight of 500 to 70,000.

2. The method of claim 1, wherein the average molecular weight of the gelatin is 2,000 to 40,000.

3. The method of claim 1, wherein the ultrafiltration membrane cuts off a molecule with a molecular weight of 10,000 or less.

4. The method of claim 1, wherein the pressure applied to the emulsion contacting the ultrafiltration membrane of the ultrafiltration unit is 1 to 10 kg /cm$^2$.

5. The method of claim 1, wherein electric conductivity of the electrodialyzed emulsion is 1 to 10 mS/cm.

6. The method of claim 1, wherein the electrodialyzing is carried out applying DC10V to DC30V.

7. The method of claim 1, wherein the silver halide grains are tabular silver halide grains having a coefficient of variation of the circle equivalent diameter of the tabular silver halide grain projected area of 0 to 30%.

8. The method of claim 7, wherein the number of tabular silver halide grains having dislocation lines of 5 or more per grain is not less than 50% of the total number of the tabular silver halide grains.

9. The method of claim 1, wherein the concentrated emulsion is not more than one third by volume of the emulsion before the concentration.

10. The method of claim 1 comprising carrying out said ultrafiltrating until the emulsion is concentrated to be not more than one third by volume of the emulsion before the concentration; and electrodialyzing said silver halide emulsion so that electric conductivity of the electrodialyzed emulsion is 1 to 10 mS/cm.

11. The method of claim 1 wherein said electrodialyzing is carried out before said ultrafiltrating.

12. The method of claim 10 wherein said electrodialyzing is carried out before said ultrafiltrating.

13. The method of claim 1 wherein said electrodialyzing and said ultrafiltrating are carried out at the same time.

14. The method of claim 10 wherein said electrodialyzing and said ultrafiltrating are carried out at the same time.

* * * * *